(12) United States Patent
Schell et al.

(10) Patent No.: US 6,388,943 B1
(45) Date of Patent: May 14, 2002

(54) DIFFERENTIAL CLOCK CROSSING POINT LEVEL-SHIFTING DEVICE

(75) Inventors: J. David Schell, Round Rock; David M. Lynch; Jaime Juarez, both of Austin, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/772,420

(22) Filed: Jan. 29, 2001

(51) Int. Cl.[7] .................................................. G11C 8/00
(52) U.S. Cl. .................................. 365/233; 365/189.11
(58) Field of Search ............................ 365/233, 189.11; 327/255

(56) References Cited

U.S. PATENT DOCUMENTS

| | | | | |
|---|---|---|---|---|
| 5,233,430 A | * | 8/1993 | Takamura et al. | 358/213.23 |
| 5,808,498 A | * | 9/1998 | Donnelly et al. | 327/255 |
| 6,172,938 B1 | * | 1/2001 | Suzuki et al. | 365/233 |

OTHER PUBLICATIONS

"DDR SDRAM Specification", Version 0.61, Samsung Electronics, Rev. 0.61 Aug. 9, 1999, pp. 1–49.

\* cited by examiner

*Primary Examiner*—Huan Hoang
(74) *Attorney, Agent, or Firm*—Conley, Rose & Tayon, PC; Robert C. Kowert

(57) ABSTRACT

Various circuits for shifting the crossing point level of a pair of differential clocks signals are disclosed. In some embodiments, a differential clock driver provides a pair of differential clock signals to a device having a specified valid range for the crossing point of the differential clock signals. A level-shifting device is coupled to one or both of the differential clock signals to shift the crossing point to lie within the valid range. The device may be a memory device in some embodiments, and in certain embodiments the memory device may be DDR SDRAM. A method for configuring a computer system is also disclosed. An actual differential clock crossing point is compared to a specified range for the crossing point. If the actual crossing point is not within the specified range, a level-shifting device is coupled to one or both of the differential clock signals.

37 Claims, 7 Drawing Sheets

DIFFERENTIAL CLOCK CROSSING POINT LEVEL-SHIFTING DEVICE

BACKGROUND OF THE INVENTION

1. Field of the Invention

This invention relates to computer systems. More particularly, this invention relates to a method and circuit for shifting the level of a differential clock crossing point.

2. Description of the Related Art

Computer system technology is rapidly advancing, enabling computer systems to operate at ever-increasing speeds. As microprocessor speeds increase, memory speeds should also increase. Otherwise, the memory will become a system bottleneck. Overall system performance will be lowered if processors are forced to waste their newly-gained speed waiting on memory. Unfortunately, memory speeds have not necessarily kept pace with processor speeds. The growing gap between processor and memory speed is becoming more of a concern as software becomes increasingly memory intensive.

One recent memory improvement is DDR SDRAM. DDR SDRAM (double data rate synchronous dynamic random access memory) is a type of SDRAM that supports data transfers on both edges of each clock cycle. By transferring data on both the rising and failing edges of the clock, DDR SDRAM effectively doubles the memory chip's data throughput. At the same time, DDR SDRAM is enough like older memory technology to allow designers to reuse some of the same testing equipment, basic motherboard technology and packaging that the older technology used. Furthermore, competing technology RDRAM (Rambus DRAM) uses a propriety standard while DDR SDRAM has an open standard. These features make DDR DRAM a desirable component in today's computer systems.

Turning now to FIG. 1, a block diagram of one embodiment of a computer system 100 including processor 10 coupled to a variety of system components through a bus bridge 102 is shown. Other embodiments are possible and contemplated. In the depicted system, a main memory 104 is coupled to bus bridge 102 through a memory bus 106, and a graphics controller 108 is coupled to bus bridge 102 through an AGP bus 110. Finally, a plurality of PCI devices 112A–112B are coupled to bus bridge 102 through a PCI bus 114. A secondary bus bridge 116 may further be provided to accommodate an electrical interface to one or more EISA or ISA devices 118 through an EISA/ISA bus 120. Processor 10 is coupled to bus bridge 102 through a CPU bus 124 and to an optional L2 cache 128.

Bus bridge 102 provides an interface between processor 10, main memory 104, graphics controller 108, and devices attached to PCI bus 114. When an operation is received from one of the devices connected to bus bridge 102, bus bridge 102 identifies the target of the operation (e.g. a particular device or, in the case of PCI bus 114, that the target is on PCI bus 114). Bus bridge 102 routes the operation to the targeted device. Bus bridge 102 generally translates an operation from the protocol used by the source device or bus to the protocol used by the target device or bus.

In addition to providing an interface to an ISA/EISA bus for PCI bus 114, secondary bus bridge 116 may further incorporate additional functionality, as desired. An input/output controller (not shown), either external from or integrated with secondary bus bridge 116, may also be included within computer system 100 to provide operational support for a keyboard and mouse 122 and for various serial and parallel ports, as desired. An external cache unit (not shown) may further be coupled to CPU bus 124 between processor 10 and bus bridge 102 in other embodiments. Alternatively, the external cache may be coupled to bus bridge 102 and cache control logic for the external cache may be integrated into bus bridge 102. L2 cache 128 is further shown in a backside configuration to processor 10. It is noted that L2 cache 128 may be separate from processor 10, integrated into a cartridge (e.g. slot 1 or slot A) with processor 10, or even integrated onto a semiconductor substrate with processor 10.

Main memory 104 is a memory in which application programs are stored and from which processor 10 primarily executes. A suitable main memory 104 comprises DRAM (Dynamic Random Access Memory). For example, a plurality of banks of SDRAM (Synchronous DRAM) or Rambus DRAM (RDRAM) may be suitable. Main memory 104 may also include DDR DRAM.

PCI devices 112A–112B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 118 is illustrative of various types of peripheral devices, such as a modem, a sound card, and a variety of data acquisition cards such as GPIB or field bus interface cards.

Graphics controller 108 is provided to control the rendering of text and images on a display 126. Graphics controller 108 may embody a typical graphics accelerator generally known in the art to render three-dimensional data structures which can be effectively shifted into and from main memory 104. Graphics controller 108 may therefore be a master of AGP bus 110 in that it can request and receive access to a target interface within bus bridge 102 to thereby obtain access to main memory 104. A dedicated graphics bus accommodates rapid retrieval of data from main memory 104. For certain operations, graphics controller 108 may further be configured to generate PCI protocol transactions on AGP bus 110. The AGP interface of bus bridge 102 may thus include functionality to support both AGP protocol transactions as well as PCI protocol target and initiator transactions. Display 126 is any electronic display upon which an image or text can be presented. A suitable display 126 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 100 may be a multiprocessing computer system including additional processors (e.g. processor 10a shown as an optional component of computer system 100). Processor 10a may be similar to processor 10. More particularly, processor 10a may be an identical copy of processor 10. Processor 10a may be connected to bus bridge 102 via an independent bus (as shown in FIG. 1) or may share CPU bus 124 with processor 10. Furthermore, processor 10a may be coupled to an optional L2 cache 128a similar to L2 cache 128.

SUMMARY

Various embodiments of a circuit and method for shifting the level of a differential clock crossing point are disclosed. In one embodiment, a differential clock driver provides a pair of differential clock signals to a memory device configured to receive the differential clock signals and having a specified valid range for the crossing point of the differential clock signals. A level-shifting circuit is coupled to one or both of the differential clock signals and configured to shift the crossing point to lie within the valid range. The memory device may be DDR SDRAM.

In some embodiments, the level-shifting circuit may include a pull-up device. The pull-up device may, in some embodiments, include two pull-up resistors coupled to a voltage source, where one resistor is coupled to one of the differential clock signals and the other resistor is coupled to the other differential clock signal. The level-shifting device may include a pull-down device in some embodiments. The pull-down device may include two pull-down resistors coupled to ground, where one resistor is coupled to one of the differential clock signals and the other resistor is coupled to the other differential clock signal. In certain embodiments, the level-shifting device may include an active component.

In another embodiment, a computer system that includes a processor, a north bridge, one or more memory devices and a differential clock level-shifting circuit is disclosed. The north bridge is coupled to the processor by a first bus. The one or more memory devices are configured to receive a pair of differential clock signals and have a specified valid range for the crossing point of the pair of differential clock signals. The system memory devices may include DDR SDRAM in some embodiments. The differential clock level-shifting circuit is coupled to one or both of the differential clock signals and is configured to shift the crossing point to lie within the valid range.

A method for configuring a computer system is also disclosed. A pair of differential clock signals is provided to a memory device having a specified valid range for the crossing point of the differential clock signals. An actual differential clock crossing point is compared to a specified range for the crossing point. If the actual crossing point is not within the specified range, a level-shifting device is coupled to one or both of the differential clock signals. In some embodiments, the level-shifting device may be coupled to one or both of the differential clock signals even if the crossing point is already within the valid range so that the crossing point can be shifted closer to an ideal value.

A differential clocking circuit is also disclosed. A device is configured to receive a pair of differential clock signals and has a specified valid range for the crossing point of the differential clock signals. The differential clock signals are provided by a differential clock driver. A level-shifting circuit is coupled to one or both of the differential clock signals and is configured to shift the crossing point to lie within the valid range.

Figure 1:
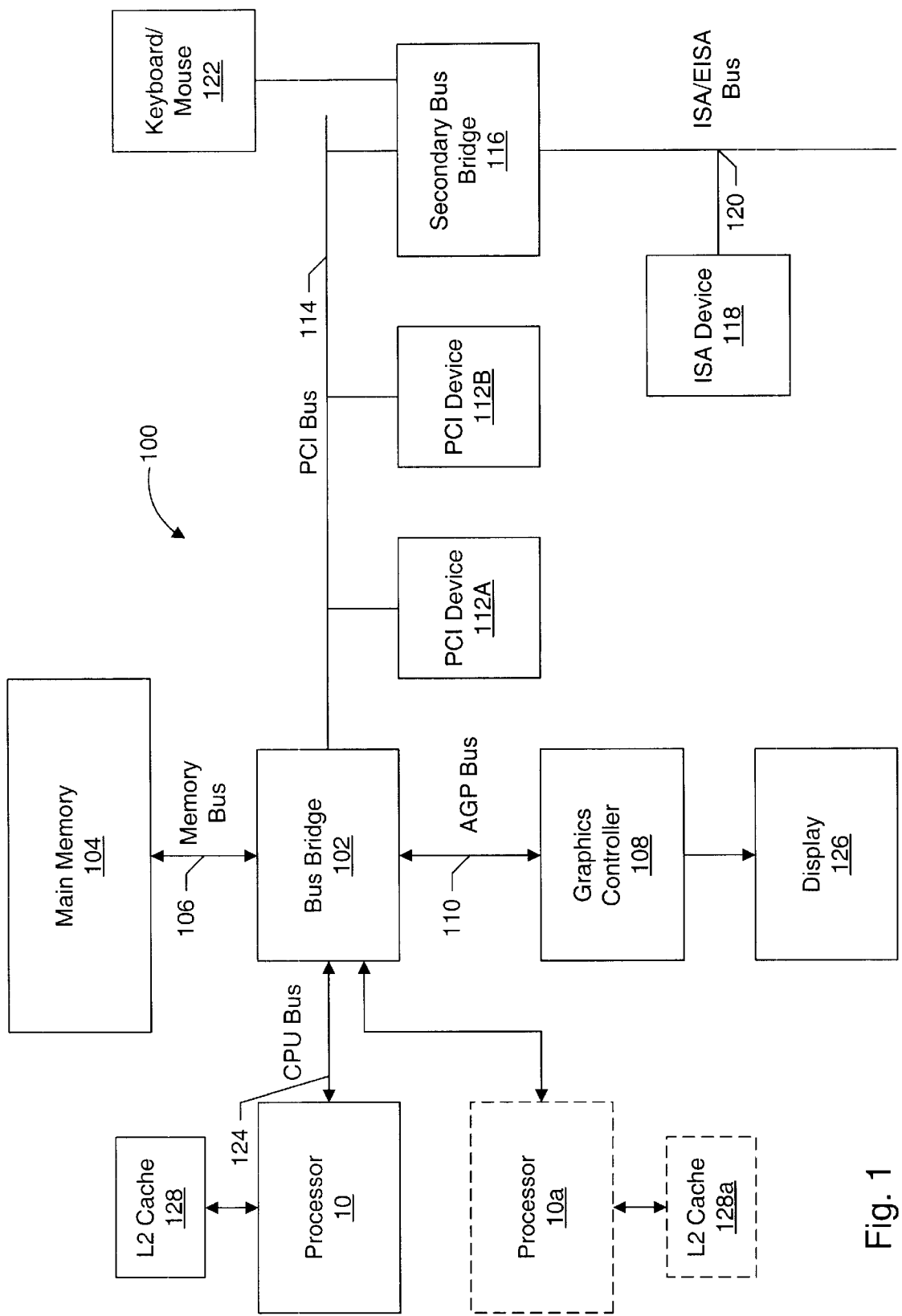
FIG. 1 is a block diagram of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 2:
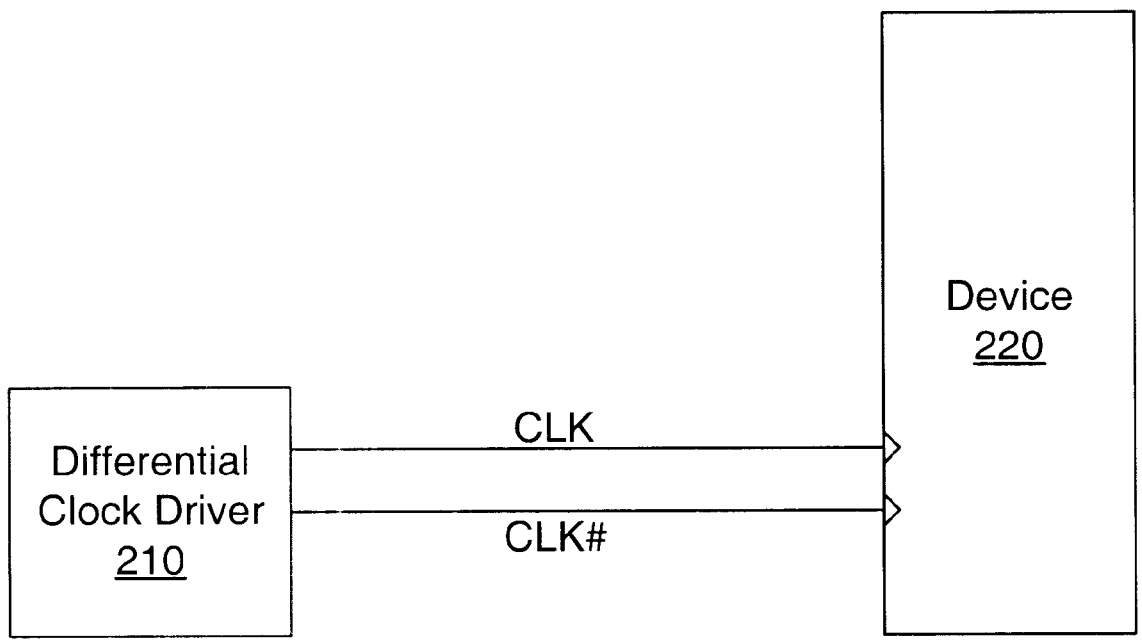
FIG. 2 is a block diagram of a differential clocking driver providing differential clock signals to a device.

In a computer system, such as computer system 100 of FIG. 1, the system memory may include one or more memory devices, such as DDR SDRAM or DIMMs (dual in-line memory modules) of DDR SDRAM. Each system memory device might have two differential clock inputs, CLK and CLK#. FIG. 2 shows a more general differential clocking system 200.

In FIG. 2, a differential clock driver 210 provides a pair of differential clock signals CLK and CLK# to a device 220. Device 200 may be any device clocked by differential clocks. In one embodiment, the device is a memory device as described above. The differential clock signals may be used to clock data into and out of the device. A differential clocking system 200 might be included in a computer system such as computer system 100. A memory device is used herein as an example of a device clocked by differential clocks; however, it is understood that the invention may be applicable to any device clocked by differential clocks.

Figure 3:
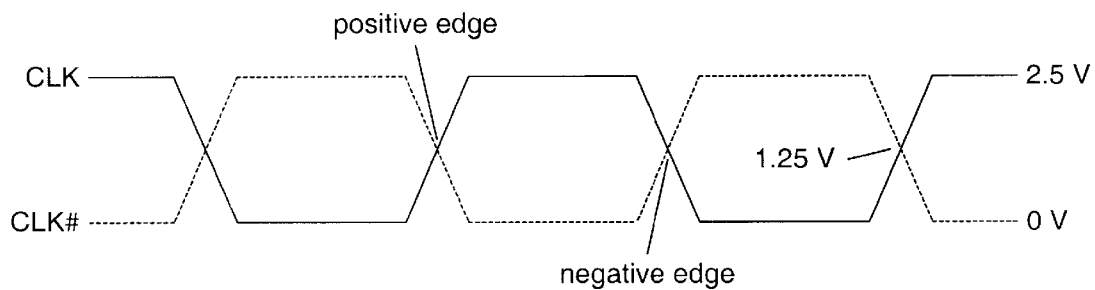
FIG. 3 is an illustration of differential clock signals with an ideal crossing point.

FIG. 3 shows an illustration of differential clock signals CLK and CLK#. Each signal is a square wave, and requires a certain amount of time to transition from high to low and from low to high. The differential clock signals are configured so that when CLK is high, CLK# is low and vice versa. The edge of the differential clock signals that includes the crossing of CLK going high and CLK# going low may be referred to as the positive edge of the differential clock, while the differential clock edge that includes the crossing of CLK going low and CLK# going high may be referred to as the negative edge of the differential clock. The device, e.g. system memory, might recognize commands such as address and control signals at every positive edge. If the memory module is a DDR SDRAM DIMM, input and output data might be registered at both the positive and negative edges. Ideally, the crossing point of the two clocks might occur at a voltage equal to 50% of the supply voltage. In FIG. 2, the clocks may swing from 2.5 V to 0 V, setting the crossing point at 1.25 V.

Like other electrical components, system memory requires that its inputs operate within certain parameters. With respect to the differential clocks, a system memory module may require that the differential clocks have an input voltage level VIN within a certain range. One example of a valid VIN range might be –0.3 V to 2.8 V. A memory module may also require that the crossing point of the differential clocks (VIX) occur within a certain voltage range. For example, Samsung's 128 Mb DDR SDRAM specification states that VIX is expected to be 0.5 VDDQ, where VDDQ is the I/O supply voltage. VDDQ should have a value of approximately 2.5 V. In the Samsung 128 Mb DDR SDRAM specification, the crossing point voltage is required to stay within the range 0.5 * VDDQ−0.2 to 0.5 VDDQ+0.2. Thus, the specification lists the valid range for the crossing point of the clock signals as lying between 1.05 and 1.45 V. Other specifications for other memory modules may specify other valid ranges for the crossing point. The valid crossing point range may also be specified by an organization such as JEDEC, which has promulgated the JEDEC Standard Double Data Rate (DDR) SDRAM Specification, JESD79. If the clocks cross outside of the specified crossing point range, the memory may not function properly and errors may occur.

Figure 4:
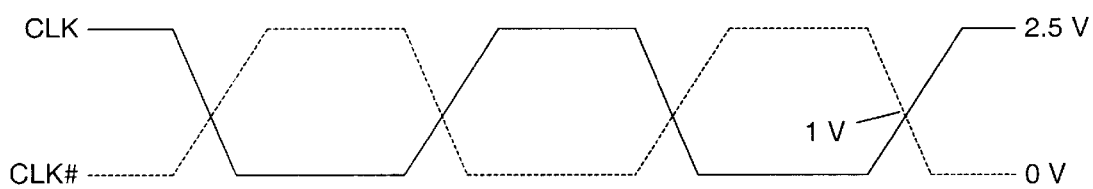
FIG. 4 is an illustration of differential clock signals with a crossing point that is lower than an ideal crossing point.

A differential clock crossing point might occur outside of a specified crossing point range for several reasons. In one situation, the differential clock driver might be unbalanced in a way that causes it to drive the clock signals high less quickly than the clocks signals are pulled low, FIG. 4 shows how a pair of differential clock signals might be affected by such a clock driver. Since the clock signals are being driven high more slowly than they are being pulled low, the crossing point is lower than 50% of the peak voltage. For example, the crossing point might be 1 V instead of the ideal 1.25 V. In some embodiments, a crossing point of 1 V may lie outside of the crossing point range specified by the memory device.

Figure 5:
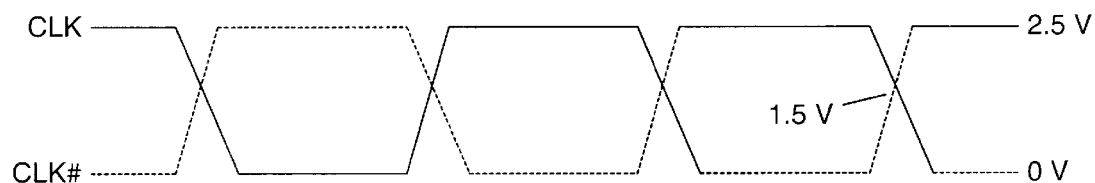
FIG. 5 is an illustration of differential clock signals with a crossing point that is higher than an ideal crossing point.

Another situation that might cause a crossing point to differ from the ideal might result from the differential clock driver driving the clock signals high more quickly than the clock signals are pulled low. FIG. 5 illustrates how differential clock signals might be affected by this situation. Because clock signals rise more quickly than they fall, the crossing point is higher than 50% of the peak voltage. For example, the crossing point might be 1.5 V, and this crossing point might lie outside of the specified crossing point range. Many permutations of the problems shown in FIGS. 4 and 5 are possible. For example, in some embodiments, a differential clock driver might only be unbalanced with respect to one of the differential clock signals. In other embodiments, one clock signal might be being driven high more quickly while the other clock signal was being driven high more slowly. In some of these embodiments, the unbalanced differential clock driver might cause the crossing point to shift left or right in addition to being more high or low than a specified crossing point range. A left or right shift might disrupt the differential clock's timing.

Figure 6:
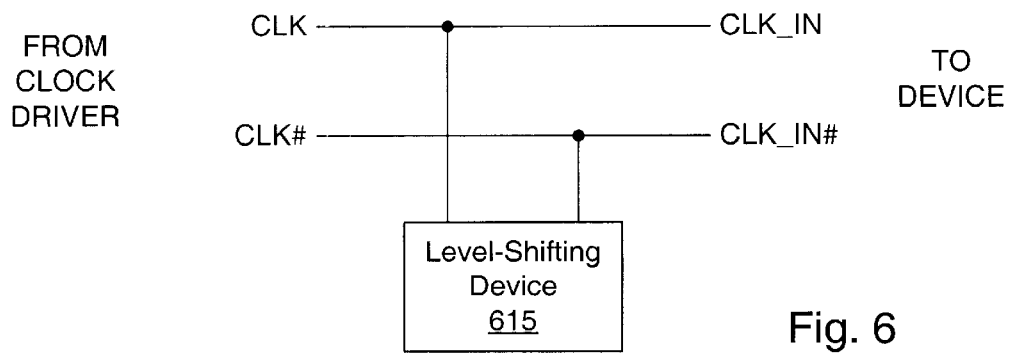
FIG. 6 is a block diagram of a circuit for shifting the crossing point of a pair of differential clock signals.

FIG. 6 shows a block diagram of a circuit that might be used to shift the crossing point level of a pair of differential clocks in a memory clocking system such as the one shown in FIG. 2. A level-shifting device 615 is coupled to one or both (illustrated) of the differential clock signals between the output of a differential clock driver and the input to a memory module. If the crossing point level is too high, the level-shifting device 615 may be configured to lower the crossing point level. For example, the level-shifting device 615 might be a pull-down device. Alternately, if the crossing point is too low, the level-shifting device 615 may be configured to raise the crossing point. In this case, a suitable level-shifting device 615 might be a pull-up device. In some embodiments, only one signal of the differential clock signal pair may need shifting, so the level-shifting device may be configured to only level-shift that one signal. In other embodiments, one clock signal may need a pull-up level-shifting device while the other clock signal may need a pull-down level-shifting device. Thus, the level-shifting device may be configured to be able to pull-up one signal while being configured to pull-down the other signal. In still other embodiments, the level-shifting device may be configured to pull-up or pull-down both signals, but it may shift one signal more or less than it shifts the other signal.

Figure 7:
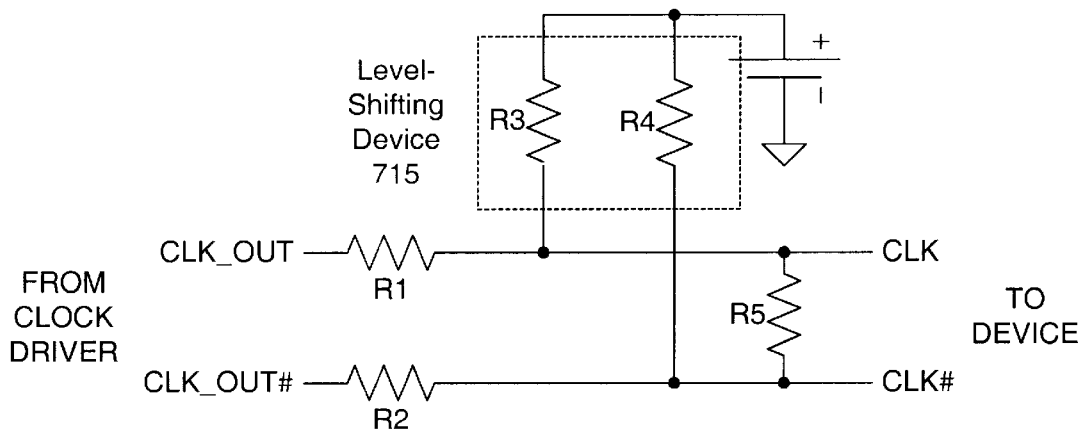
FIG. 7 is a circuit for shifting the differential clock crossing point to a higher voltage level.

FIG. 7 shows one embodiment of a level-shifting device 715. In this circuit, the level-shifting device 715 raises the crossing point of the differential clock signals CLK and CLK#. Here, resistors R1 and R2 are connected to differential clock driver outputs CLK_OUT and CLK_OUT#. The series resistors R1 and R2 are damping resistors that might be used to prevent ringing. In one embodiment, the resistors R1 and R2 may have a value of 33 ohms each. In other embodiments, other resistor values may be chosen. Alternately, resistors R1 and R2 may not be included in some embodiments. The resistor R5 may be used to stabilize the differential clock inputs CLK_IN and CLK_IN# to the memory module. The resistor R5 may have a value of 120 ohms in one embodiment. In this embodiment, the level-shifting device 715 is a pull-up device and may include resistors R3 and R4. The pull-up resistor R3 may be connected between CLK and a voltage source. Similarly, the resistor R4 may couple differential clock signal CLK# to the voltage source. The voltage source might be the I/O supply voltage, VDDQ. The resistors R3 and R4 pull the clock signals up to the voltage source. In some embodiments, the pull-up resistors may cause the signals to rise slightly more quickly and to fall slightly more slowly and thus shift the crossing point upward. In some embodiments, only one of the clock signals may need a pull-up resistor, so a pull-up resistor may only be coupled to that signal. In other embodiments, both signals may be coupled to pull-up resistors having the same value. In this way, both signals may be shifted by the same amount. In other embodiments, the pull-up resistors may have different values in order to pull one signal up more or less than the other. While this embodiment shows the level-shifting device 715 coupled to the clock signals between the resistors R1 and R2 and the resistor R5, other embodiments may couple the level-shifting device to the differential clock signals at another point in the circuit, such as on the clock driver side of series resistors R1 and R2.

Figure 8:
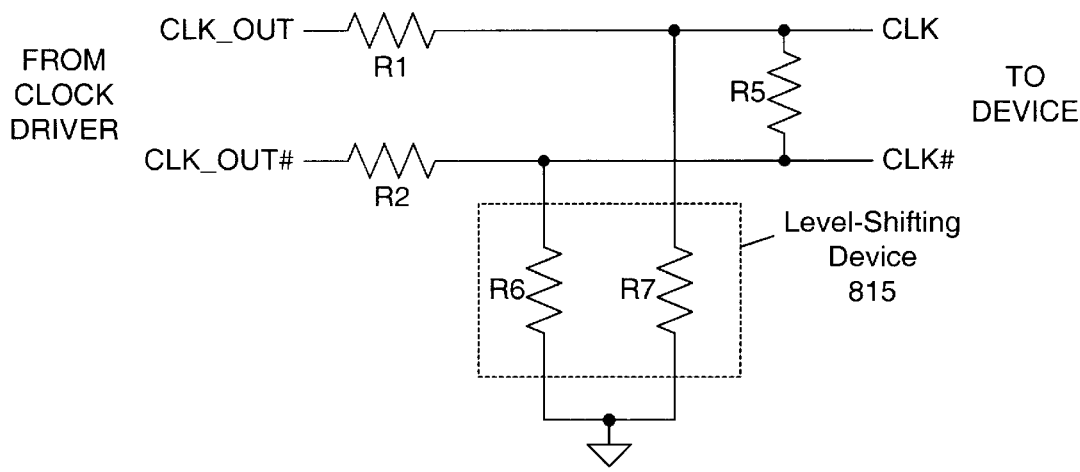
FIG. 8 is a circuit for shifting the differential clock crossing point to a lower voltage level.

FIG. 8 shows another embodiment of a level-shifting device 815. In some embodiments, two series damping resistors R1 and R2 may be connected to differential clock driver outputs CLK_OUT and CLK_OUT#. The resistors R1 and R2 might have a value of 33 ohms. A resistor R5 may stabilize the differential clock inputs CLK_IN and CLK_IN# at the input to the memory module in certain embodiments. The resistor R5 may have a value of 120 ohms. In this embodiment, the level-shifting device 815 is a pull-down device and may include resistors R6 and R7. The resistor R6 may connect differential clock signal CLK to ground. Similarly, the resistor R7 may couple differential clock signal CLK# to ground. By coupling the clock signals to ground, the level-shifting device 815 causes the differential clock crossing point of CLK and CLK# to shift downward. In some embodiments, the pull-down resistors may cause the signals to fall slightly more quickly and to rise slightly more slowly and thus shift the crossing point downward. In some embodiments, only one of the clock signals may need a pull-down resistor, so a pull-down resistor may only be coupled to that signal. In other embodiments, both signals may be coupled to pull-down resistors having the same value. In this way, both signals may be shifted by the same amount. In other embodiments, the pull-down resistors may have different values in order to pull one signal down more or less than the other. While this embodiment shows the level-shifting device 815 coupled to the clock signals between the resistors R1 and R2 and the resistor R5, other embodiments may couple the level-shifting device to the differential clock signals at another point in the circuit, such as on the clock driver side of series resistors R1 and R2.

Figure 9:
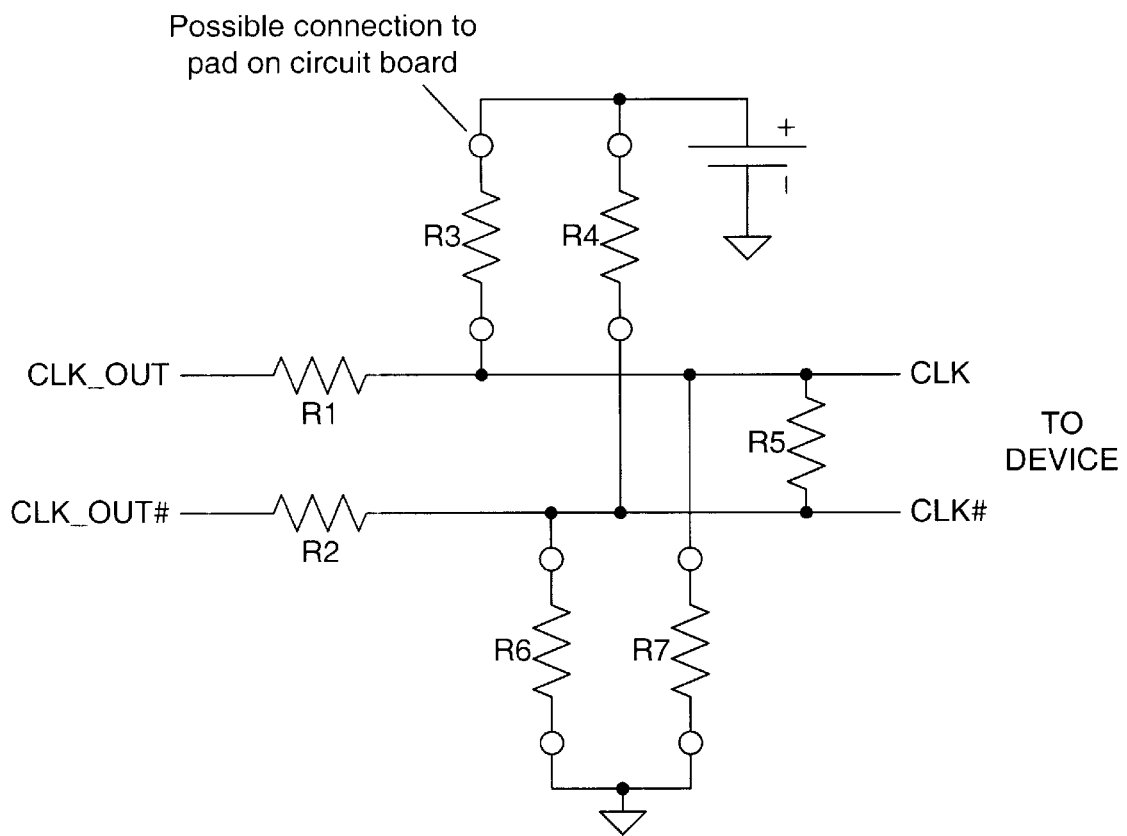
FIG. 9 is a circuit that can be configured to shift differential clock crossing points up or down.

In some embodiments, FIGS. 7 and 8 might be combined, e.g. on a circuit board, by providing resistors for both pulling up and pulling down the differential clock signals. FIG. 9 shows one embodiment configured this way. As needed, the resistors may be connected to pads on the circuit board, For example, if the clock crossing point is high, the pull-down resistors may be connected. Alternately, if the clock crossing point is low, the pull-up device may be connected. In embodiments where one signal needs to be pulled up or pulled down, only one of the pull-up or pull-down resistors may be connected. In other embodiments, a pull-up device may be connected to one device while a pull-down device may be connected to another signal. Additionally, while the embodiments shown in FIGS. 7 and 8 use pull-up and pull-down resistors for level-shifting devices, other passive pull-up or pull-down devices might be used in other embodiments. In still other embodiments, active pull-ups and pull-downs might be used.

Figure 10:
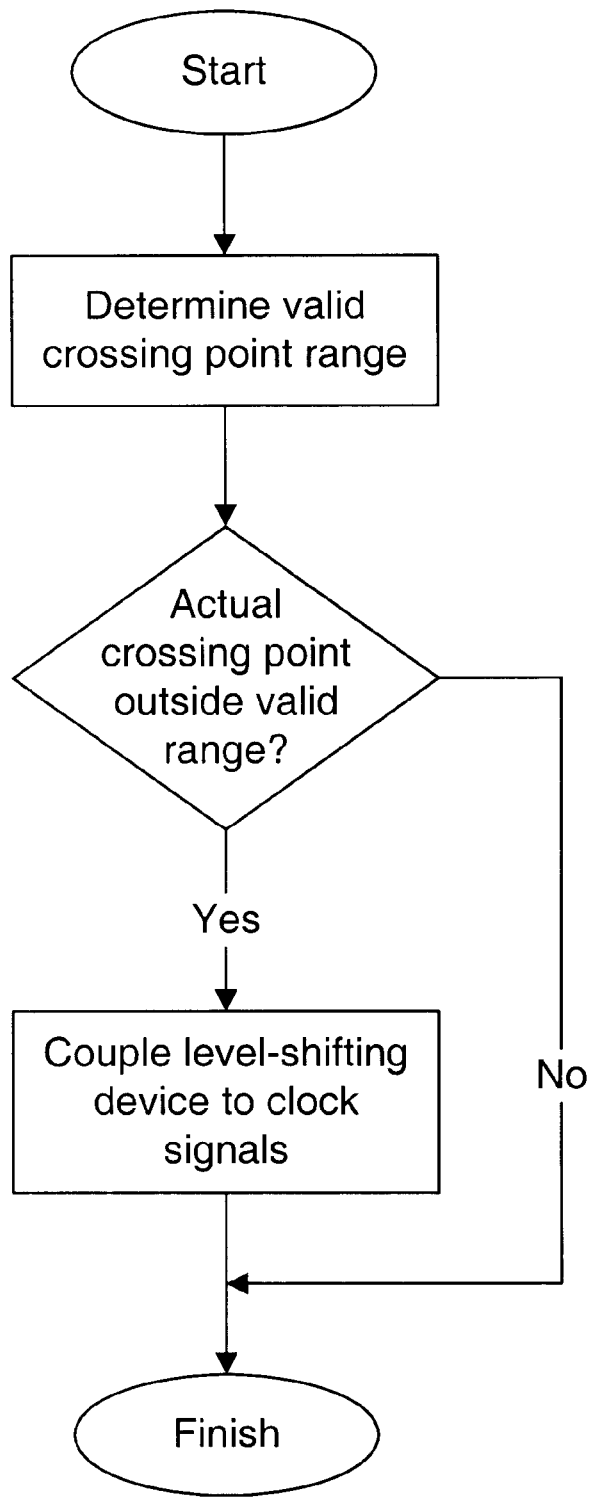
FIG. 10 is a flowchart showing a method of shifting the differential clock crossing point.

FIG. 10 shows a flow chart illustrating one method for shifting the crossing point of a pair of differential clock signals into a valid range required by memory. First, the actual crossing point is determined. This may be accomplished by measuring the actual differential clock signals or by measuring the drive strength of the differential clock driver. Next, the actual crossing point is compared to the required crossing point range. The actual crossing point may be too high or too low with respect to the required crossing point range. If the actual crossing point is outside of the valid range, a level-shifting device is coupled to the clock signals. For example, if the actual crossing point is lower than the valid range, the differential clock crossing point might be raised by coupling a pull-up device to the clock signals. In some embodiments, a pull-up device might include a pair of pull-up resistors like those shown in FIG. 7. In other embodiments, the pull-up device might include an active pull-up. If the actual crossing point is too high, connecting a pull-down device to the clock signals may lower the crossing point. FIG. 8 shows one embodiment of a pull-down device. The value of the level-shifting device may be tuned according to the discrepancy between the actual crossing point and the specified crossing point range. In some embodiments, one clock signal may need to be shifted more than the other, while in other embodiments one of the clock signals may not need to be shifted at all. In other embodiments, one signal may be shifted up while the other signal is shifted down. If the crossing point is within the valid range, a level-shifting device might not be used at all. However, in some embodiments, the level-shifting device might still be used despite the actual crossing point being within the valid range. For example, a level-shifting device might be used to bring the crossing point closer to a specified or ideal value of the crossing point even though the crossing point already lies within the valid range.

Figure 11:
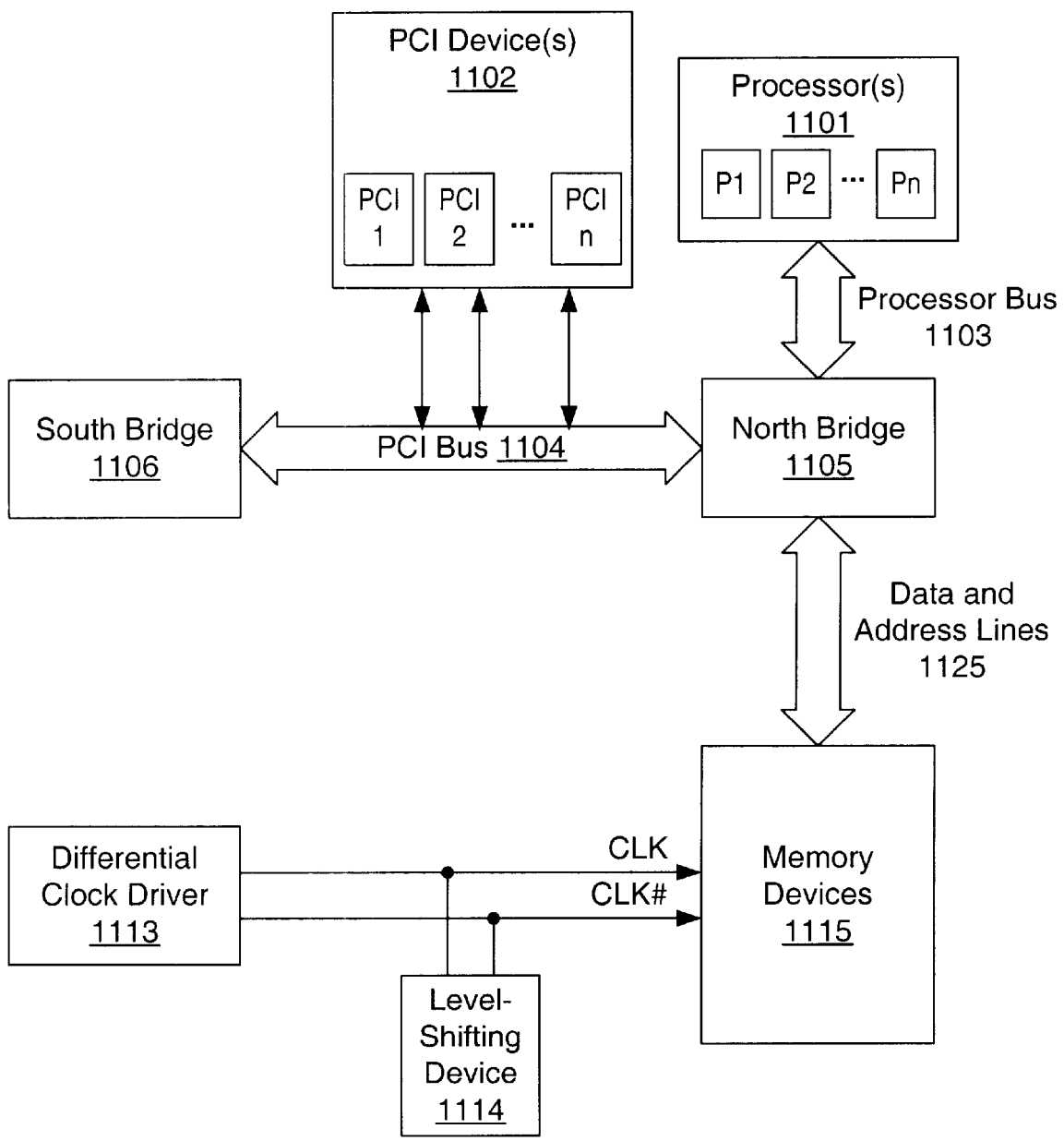
FIG. 11 is a block diagram of a computer system including a differential clock level-shifting circuit.

FIG. 11 illustrates how one embodiment may be used in a computer system 1100. The computer system 1100 has one or more processors 1101 coupled by a processor bus 1103 to a north bridge 1105. The north bridge 1105, also known as a system controller, may contain such devices as a memory controller, a Peripheral Component Interconnect (PCI) bus controller, and an Accelerated Graphics Port (AGP). Preferably, the north bridge forwards data, address and control signals between the processor bus, the PCI bus and the memory. The north bridge is coupled to one or more memory devices 1115 by the data and address signals 1125. PCI bus 1104 couples the north bridge 1105 to a south bridge 1106. The south bridge 1106, also known as a peripheral bus controller, may contain devices such as a PCI to Industry Standard Architecture (ISA) bridge, an Enhanced Integrated Device Electronics (EIDE) controller, and a Universal Serial Bus (USB) controller. The south bridge 1106 may perform administrative functions such as interrupt management, clock/calendar/timer functions, configuration management, power supply control, and power-on signal sequencing. The PCI bus 1104 is connected to one or more PCI devices 1102.

Additionally, a differential clock driver 1113 provides a pair of differential clock signals, CLK and CLK# to one or more of the memory devices 1115. The differential clock driver 1113 may be included within the north bridge 1105 in some embodiments, or in another component. A level-shifting device 1114 is configured to shift a crossing point of the differential clocks by being coupled to one or both of the differential clock signals. In some embodiments, the level-shifting device 1114 may be a pull-up device. In other embodiments, the level-shifting device 1114 may be a pull-down device. In still other embodiments, the level-shifting device 1114 may include a pull-up device and a pull-down device.

Numerous variations and modifications will become apparent to those skilled in the art once the above disclosure is fully appreciated. It is intended that the following claims be interpreted to embrace all such variations and modifications.

What is claimed is:

1. A memory clocking circuit, comprising:
   a memory device configured to receive a pair of differential clock signals and having a specified valid range for a crossing point of the pair of differential clock signals;
   a differential clock driver configured to provide the pair of differential clock signals to the memory device; and
   a level-shifting circuit coupled to one or both of the pair of differential clock signals and configured to shift the crossing point to lie within the specified valid range;
   wherein the memory device is a double data rate (DDR) synchronous dynamic random access memory (SDRAM) dual inline memory module (DIMM).

2. The memory clocking circuit of claim 1, wherein the level-shifting circuit comprises at least one active component.

3. A memory clocking circuit, comprising:
   a memory device configured to receive a pair of differential clock signals and having a specified valid range for a crossing point of the pair of differential clock signals;
   a differential clock driver configured to provide the pair of differential clock signals to the memory device; and
   a level-shifting circuit coupled to one or both of the pair of differential clock signals and configured to shift the crossing point to lie within the specified valid range;
   wherein the level-shifting circuit comprises a pull-up device.

4. The memory clocking circuit of claim 3, wherein the pull-up device comprises one or more pull-up resistors coupled to a voltage source, wherein a first pull-up resistor is coupled to a first signal of the pair of differential clock signals and a second pull-up resistor is coupled to a second signal of the pair of differential clock signal.

5. The memory clocking circuit of claim 3, wherein the level-shifting circuit comprises at least one active component.

6. A memory clocking circuit, comprising:
a memory device configured to receive a pair of differential clock signals and having a specified valid range for a crossing point of the pair of differential clock signals;
a differential clock driver configured to provide the pair of differential clock signals to the memory device; and
a level-shifting circuit coupled to one or both of the pair of differential clock signals and configured to shift the crossing point to lie within the specified valid range; wherein the level-shifting circuit comprises a pull-down device.

7. The memory clocking circuit of claim 6, wherein the pull-down device comprises one or more pull-down resistors coupled to ground, wherein a first pull-down resistor is coupled to a first signal of the pair of differential clock signals and a second pull-down resistor is coupled to a second signal of the pair of differential clock signal.

8. The memory clocking circuit of claim 6, wherein the level-shifting circuit comprises at least one active component.

9. A computer system, comprising:
a processor;
a north bridge coupled to the processor by a first bus;
one or more memory devices coupled to said north bridge and configured with a pair of differential clock inputs for receiving a pair of differential clock signals and having a specified valid range for a crossing point of the pair of differential clock signals, wherein the one or more memory devices are configured to store one or more programs executable by said processor; and
a differential clock level-shifting circuit configured to shift the crossing point of the pair of differential clock signals to lie within the valid range, wherein the differential clock level-shifting circuit is configured to be coupled to one or both of the pair of differential clock signals.

10. The computer system of claim 9, wherein the one or more memory devices comprise one or more DDR SDRAM DIMMs.

11. The computer system of claim 9, wherein the north bridge is configured to provide the pair of differential clock signals.

12. The computer system of claim 9, wherein the differential clock level-shifting circuit comprises at least one active component.

13. The computer system of claim 9, wherein the differential clock level-shifting circuit comprises a pull-up device.

14. The computer system of claim 13, wherein the pull-up device comprises one or more pull-up resistors coupled to a voltage source, wherein a first pull-up resistor is coupled to a first signal of the pair of differential clock signals and a second pull-up resistor is coupled to a second signal of the pair of differential clock signal.

15. The computer system of claim 9, the differential clock level-shifting circuit comprises a pull-down device.

16. The computer system of claim 15, wherein the pull-down device comprises one or more pull-down resistors coupled to ground, wherein a first pull-down resistor is coupled to a first signal of the pair of differential clock signals and a second pull-down resistor is coupled to a second signal of the pair of differential clock signal.

17. A method of configuring a computer system, comprising:
providing a pair of differential clock signals to a memory device, wherein a specification for the memory device specifies a valid range for a crossing point of the pair of differential clock signals;
detecting the crossing point;
comparing the crossing point to the valid range; and
coupling a level-shifting device to one or both of the pair of differential clock signals if the crossing point is not within the valid range.

18. The method of claim 17, wherein the memory device is a DDR SDRAM DIMM.

19. The method of claim 17, wherein if the crossing point is below the valid range, said coupling comprises coupling a pull-up device to at least one of the pair of differential clock signals.

20. The method of claim 17, wherein the pull-up device comprises a plurality of pull-up resistors coupled to a voltage source, wherein a first pull-up resistor is coupled to a first signal of the pair of differential clock signals and a second pull-up resistor is coupled to a second signal of the pair of differential clock signals.

21. The method of claim 17, wherein the level-shifting device comprises at least one active component.

22. The method of claim 17, wherein if the crossing point is above the valid range, said coupling comprises coupling a pull-down device to at least one of the pair of differential clock signals.

23. The method of claim 22, wherein the pull-down device comprises a plurality of pull-down resistors coupled to ground, wherein a first pull-down resistor is coupled to a first signal of the pair of differential clock signals and a second pull-down resistor is coupled to a second signal of the pair of differential clock signal.

24. The method of claim 23, further comprising providing a plurality of pads on a printed circuit board for coupling one or more level-shifting devices to a pair or differential clock signals, wherein said coupling comprises connecting the level-shifting device to a one or more of the pads.

25. The method of claim 24, further comprising coupling the level-shifting device to the differential clock signals if the crossing point is within the valid range in order to bring the crossing point closer to an ideal crossing point value.

26. A differential clocking circuit, comprising:
a device configured to receive a pair of differential clock signals and having a specified valid range for a crossing point of the pair of differential clock signals;
a differential clock driver configured to provide the pair of differential clock signals to the device; and
a level-shifting circuit coupled to one or both of the pair of differential clock signals and configured to shift the crossing point to lie within the valid range;
wherein the level-shifting circuit comprises a pull-up device.

27. The differential clocking circuit of claim 26, wherein the pull-up device comprises one or more pull-up resistors coupled to a voltage source, wherein a first pull-up resistor is coupled to a first signal of the pair of differential clock signals and a second pull-up resistor is coupled to a second signal of the pair of differential clock signal.

28. The differential clocking circuit of claim 26, wherein the level-shifting circuit comprises at least one active component.

29. A differential clocking circuit, comprising:
a device configured to receive a pair of differential clock signals and having a specified valid range for a crossing point of the pair of differential clock signals;
a differential clock driver configured to provide the pair of differential clock signals to the device; and a level-shifting circuit coupled to one or both of the pair of differential clock signals and configured to shift the crossing point to lie within the valid range;
wherein the level-shifting circuit comprises a pull-down device.

30. The differential clocking circuit of claim 29, wherein the pull-down device comprises one or more pull-down resistors coupled to ground, wherein a first pull-down resistor is coupled to a first signal of the pair of differential clock signals and a second pull-down resistor is coupled to a second signal of the pair of differential clock signal.

31. The differential clocking circuit of claim 29, wherein the level-shifting circuit comprises at least one active component.

32. A differential clocking circuit, comprising:
a device configured to receive a pair of differential clock signals and having a specified valid range for a crossing point of the pair of differential clock signals;
a differential clock driver configured to provide the pair of differential clock signals to the device; and
a level-shifting circuit coupled to one or both of the pair of differential clock signals and configured to adjust the rise or fall time of one or both of the differential clock signals to shift the crossing point to lie within the valid range.

33. The differential clocking circuit as recited in claim 32, wherein the level-shifting circuit is configured to decrease the rise time and increase the fall time of one of the pair of differential clock signals.

34. The differential clocking circuit as recited in claim 32, wherein the level-shifting circuit is configured to Increase the rise time and decrease the fall time of one of the pair of differential clock signals.

35. The differential clocking circuit as recited in claim 32, wherein the device comprises a random access memory.

36. A differential clocking circuit, comprising:
a random access memory (RAM) device configured to receive a pair of differential clock signals and having a specified valid range for a crossing point of the pair of differential clock signals;
a differential clock driver configured to provide the pair of differential clock signals to the RAM device; and
a level-shifting circuit coupled to one or both of the pair of differential clock signals and configured to shift the crossing point to lie within the valid range.

37. The differential clocking circuit as recited in claim 36, wherein the level-shifting circuit is configured to adjust the rise or fall time of one or both of the differential clock signals.

* * * * *